(12) United States Patent
Farn et al.

(10) Patent No.: US 7,689,905 B1
(45) Date of Patent: Mar. 30, 2010

(54) CONTAINMENT OF TERMINAL APPLICATION RUN-TIME DATA FOR VIEWING WHEN DISCONNECTED FROM A HOST SERVER

(75) Inventors: Brian G. Farn, Toronto (CA); Edmund H. Reinhardt, Scarborough (CA)

(73) Assignee: International Business Machines Corporation, Armonk, NY (US)

( * ) Notice: Subject to any disclaimer, the term of this patent is extended or adjusted under 35 U.S.C. 154(b) by 5 days.

(21) Appl. No.: 12/265,287

(22) Filed: Nov. 5, 2008

(51) Int. Cl.
*G06F 15/00* (2006.01)

(52) U.S. Cl. .................. 715/234; 715/778; 715/808; 715/762; 715/744; 715/745; 715/746; 715/747

(58) Field of Classification Search .................. 715/234, 715/778, 744–7, 808, 762
See application file for complete search history.

(56) References Cited

U.S. PATENT DOCUMENTS

| | | | |
|---|---|---|---|
| 6,308,146 B1 | 10/2001 | La Cascia, Jr. et al. | |
| 6,802,058 B2* | 10/2004 | Banavar et al. | 717/138 |
| 7,213,228 B2* | 5/2007 | Putterman et al. | 717/109 |
| 7,281,236 B1 | 10/2007 | Galvin et al. | |
| 2002/0042849 A1* | 4/2002 | Ho et al. | 709/329 |
| 2002/0143981 A1* | 10/2002 | DeLima et al. | 709/233 |
| 2002/0178299 A1* | 11/2002 | Teubner | 709/320 |
| 2003/0048296 A1* | 3/2003 | Cullen et al. | 345/744 |
| 2004/0015842 A1* | 1/2004 | Nanivadekar et al. | 717/109 |
| 2004/0015893 A1* | 1/2004 | Banavar et al. | 717/138 |
| 2004/0034719 A1* | 2/2004 | Peterson et al. | 709/250 |
| 2004/0054969 A1* | 3/2004 | Chiang et al. | 715/513 |
| 2004/0183827 A1* | 9/2004 | Putterman et al. | 345/744 |
| 2005/0038830 A1* | 2/2005 | Lee | 707/200 |
| 2005/0066284 A1* | 3/2005 | Ho et al. | 715/762 |
| 2005/0081098 A1* | 4/2005 | Demaray et al. | 714/15 |
| 2005/0203944 A1* | 9/2005 | Dinh et al. | 707/102 |
| 2005/0256882 A1* | 11/2005 | Able et al. | 707/10 |
| 2006/0248205 A1* | 11/2006 | Randle et al. | 709/229 |
| 2006/0277027 A1 | 12/2006 | Mann et al. | |
| 2007/0039049 A1* | 2/2007 | Kupferman et al. | 726/22 |
| 2008/0209392 A1* | 8/2008 | Able et al. | 717/105 |
| 2008/0250434 A1* | 10/2008 | Ho et al. | 719/329 |
| 2009/0113017 A1* | 4/2009 | Parcher et al. | 709/207 |

FOREIGN PATENT DOCUMENTS

JP 2001075634 3/2001

* cited by examiner

*Primary Examiner*—Nathan Hillery
(74) *Attorney, Agent, or Firm*—Patents On Demand, PA; Brian K. Buchheit

(57) ABSTRACT

Run-time data and visual layout definition data can be stored in a storage medium. The run-time data and the visual layout definition data can be associated with a terminal application, which is configured to communicate with a host server in blocks of data in accordance with a standardized synchronous terminal protocol. A visual screen for the terminal application can be generated by combining the layout data and the run-time data. The generating can occur when the terminal application is disconnected from the host server or host server emulator. The generated visual screen, which is a screen of a front-end of a terminal application interface, can be presented.

9 Claims, 7 Drawing Sheets

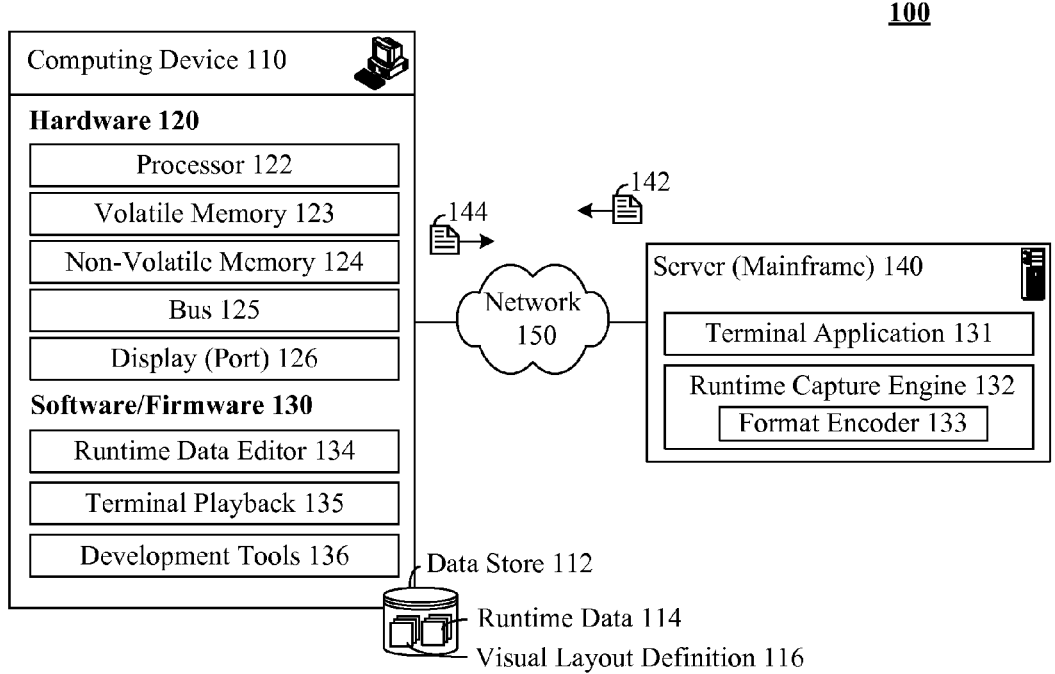
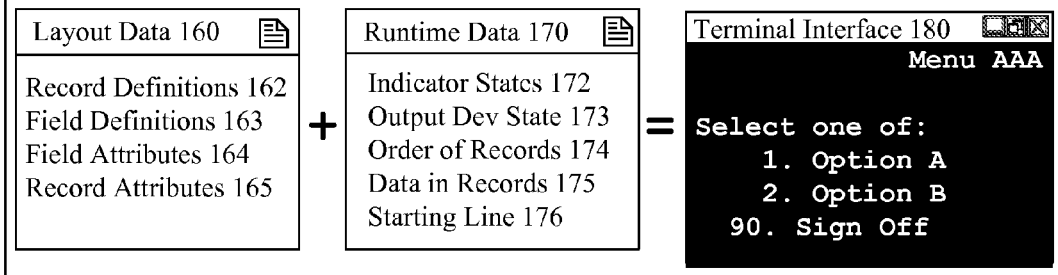
FIG. 1

FIG. 3

| Screens | Records | Indicators | Values | Cursor |
|---|---|---|---|---|
| SCREEN1 | | | | |
| SCREEN2 | | | | |

| | | COND1 | 2 |
|---|---|---|---|
| ⊞ INFO | | | |
| ⊟ ENTRY | | none | none |
| CUST | 12345 | | |
| NAME | John | | |
| ADDRESS | 49 My Street | | |
| CITY | Chicago | | |
| STATE | Illinois | | |
| ZIP | 1234567 | | |

FIG. 4

| Screens | Records | Indicators | Values | Cursor |
|---|---|---|---|---|
| SCREEN1 | | | | |
| SCREEN2 | | | | |

Cursor Position

☑ Enable

| Row | Column |
|---|---|
| 19 | 75 |
| 20 | 76 |
| 21 | 77 |
| 22 | 78 |
| 23 | 79 |
| 24 | 80 |

| Element | Description | Child Elements | Attributes |
|---|---|---|---|
| Record sequences | Top level lement describing a collection of sequences of record writes where each sequence is equivalent to a screen. There may only be one occurrence of this element. | device 0..1<br>sequence0..n<br>named data 0..1 | |
| device | The type of device that this set of record sequences is associated with. | | type<br>width<br>height |
| sequence | A set of record writes to a device ordered by when each record write occurred. A sequence of record writes it synonymous to a screen. A device element, when specified overrides any device element specified at a parent record sequences | device 0..1<br>property 0..n<br>record - write 0..n | |
| property | A property of the parent element | | name<br>value |
| record - write | A write of a record to the device | Property 0..n<br>field - data 1<br>record - write 0..n | record - format<br>indicators<br>indicator data<br>repetition<br>field - data |
| field - data | A collection of reusable field data | field 0..n | id<br>record - format |
| field | A field within the parent written record | | named data |
| named - data | A collection of reusable data (field data and/or indicator data) | field - data 0..n<br>indicator - data 0..n | |
| indicator - data | A collection of reusable sets of indicators | | id indicators |

FIG. 6

```xml
<record-sequences>
<!-- Default device specification -- >
<device type="display" width="80" height="24" />

<sequence>
<!-- Overriding device specification -- >
<device type="display" width="127" height="32" />

<!-- Device specific information -- >
<property name="cursor-row" value="1" />
<property name="cursor-column" value="1" />

<!-- Sequence record writes -- >
<record-write record-format="standard1" indicators="01 04">
<property name="snlo" value="" />
<field-data>
<field name="" data="" />
<field name="" data="" />
</field-data>
</record-write>

<!-- Subfile control record -- >
<record-write record-format="subfilecontrol1"
indicators="05">

<!-- Subfile record format name for all nested record writes -- >
<property name="subfile" value="subfile1" />

<field-data>
<field name="" data="" />
<field name="" data="" />
</field-data>
```

```xml
<!-- Possible nesting -- >
<!-- References to shared indicator sets and field data -- >
<!-- Repetition allows for writing the same record specified
number of times -- >
<record-write field-data="subfile1-normal" repetition="10" />
<record-write field-data="subfile1-error2" repetition="2"
indicator-data="indicators1" />
<record-write field-data="subfile1-normal" repetition="10" />
<record-write field-data="subfile1-error2" repetition="1"
indicator-data="indicatort2" />

</record-write>
</sequence>
<sequence>
...
</sequence>

<named-data>
<indicator-data id="indicators1" indicators="01 02 11" />
<indicator-data id="indicators2" indicators="04" />

<field-data id="subfile1-normal" record-format="subfile1">
<field name="" data="" />
<field name="" data="" />
</field-data>

<field-data id="subfile1-error" record-format="subfile1">
<field name="" data="" />
<field name="" data="" />
</field-data>
</named-data>
</record-sequences>
```

FIG. 7

CONTAINMENT OF TERMINAL APPLICATION RUN-TIME DATA FOR VIEWING WHEN DISCONNECTED FROM A HOST SERVER

BACKGROUND

The present invention relates to the field of terminal services and, more particularly, to containment of terminal application run-time data for viewing when disconnected from a host server.

A terminal application, terminal emulator, or tty for short, is a program that emulates a "dumb" video terminal within some other display architecture. A terminal application covers all remote terminals, which include graphical user interfaces (GUI) and text user interfaces (TUI). A block-oriented terminal is a type of terminal application that communicates with its host server in blocks of data. That is, a terminal application sends records of data to and from the host.

Many terminal applications utilize a visual layout file, which is externally defined from the terminal application. Different standards of visual layout files include Data Description Specification, Basic Mapping Support, computer program product Format services (MFS), Interactive System Productivity Facility (ISPF), and the like. While a front-end of terminal applications have historically been TUIs, modernized ones exist, which have GUI front-ends. These GUI applications use layout definition files, which are often JAVA server pages. From the perspective of the host server, the front-end terminal application to which it communicates is transparent.

At present, interactions involving a remote terminal application require a live connection be established with a host server, which makes design and testing of many terminal based applications difficult. Alternatively, interactions involving a remote terminal application require use of an emulator for a host server that has its own shortcomings, such as greatly diminished response time and emulator establishment and maintenance costs.

It is challenging to modernizing an existing terminal based application from a TUI front-end to a GUI front-end. During this modernization, testing back and forth between the existing text-based front-end and the under-development GUI front-end is time consuming and error prone. Another challenge with testing terminal applications is that it is often difficult or time consuming to place a system into a desired state for testing. For example, to test a particular logic path, a series of actions may need to be conducted, which place the server providing data to the terminal application into a particular state (e.g., take a logic pathway to get to the Menu ABC, Option XYZ.).

Further, security considerations can restrict access to the host server, which increases a difficulty to outsource software development functions in a terminal application situation. Additionally, propriety aspects of mainframe systems and a tight degree of integration between the remote terminal applications and the mainframe system or software running on the host server makes it difficult for developers to leverage code/functionality in a platform independent manner (as required for Service Oriented Architectures).

BRIEF DESCRIPTION OF THE SEVERAL VIEWS OF THE DRAWINGS

FIG. 1 is a schematic diagram of a system for containing terminal application run-time data for viewing when disconnected from a host server in accordance with an embodiment of the inventive arrangements disclosed herein.

FIG. 3 shows an interface permitting the various indictors to be manually edited.

FIG. 4 shows a sample interface that allows a user to assign sample run-time properties.

FIG. 5 shows a user interface that permits a user to specify a cursor position to simulate a position of a cursor at a time records are being written.

FIG. 6 shows a table, which provides a sample XML based definition for run-time data of a terminal application.

FIG. 7 shows a sample XML based document for defining run-time data of a terminal application.

DETAILED DESCRIPTION

Figure 2:
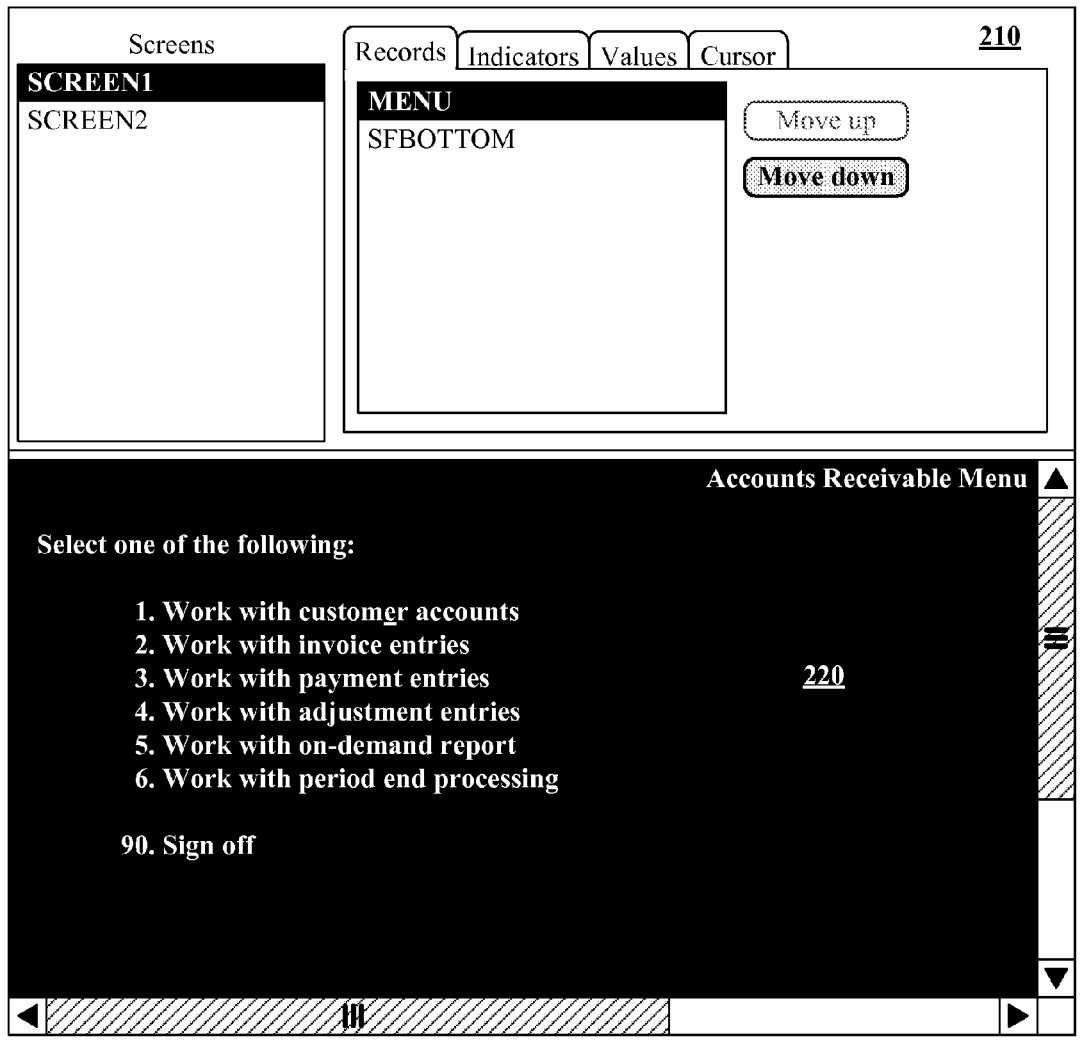
FIG. 2 shows a preview of a screen (which conforms to an IBM 5250 protocol standard) contained within a user interface.

The disclosure provides a solution for containment of remote terminal application run-time data for viewing when disconnected from a host server. The solution takes advantage of a fact that given a remote terminal application with one or more visual layout definitions, buffers of application data, and sufficient information about states of the device, the visuals for the terminal-based application can be reconstructed after the application has been run in a server-connected configuration. Run-time data can be directly edited (in addition to/in place of being captured), which facilitates testing, development of specific scenarios. In one embodiment, the run-time data can be stored in a persistent format, such as XML. The solution permits terminal application front-end interfaces to be developed using realistic data, without being connected to a host server, and without utilizing an emulator for the host server.

The present invention may be embodied as a method, system, or computer program product. Accordingly, the present invention may take the form of an entirely hardware embodiment, an entirely software embodiment (including firmware, resident software, micro-code, etc.) or an embodiment combining software and hardware aspects that may all generally be referred to herein as a "circuit," "module" or "system." Furthermore, the present invention may take the form of a computer program product on a computer usable storage medium having computer usable program code embodied in the medium. In a preferred embodiment, the invention is implemented in software, which includes but is not limited to firmware, resident software, microcode, etc.

Furthermore, the invention can take the form of a computer program product accessible from a computer usable or computer readable medium providing program code for use by or in connection with a computer or any instruction execution system. For the purposes of this description, a computer usable or computer readable medium can be any apparatus that can contain, store, communicate, propagate, or transport the program for use by or in connection with the instruction execution system, apparatus, or device. The computer usable medium may include a propagated data signal with the computer usable program code embodied therewith, either in baseband or as part of a carrier wave. The computer usable program code may be transmitted using any appropriate medium, including but not limited to the Internet, wireline, optical fiber cable, RF, etc.

Any suitable computer usable or computer readable medium may be utilized. The computer usable or computer readable medium may be, for example but not limited to, an electronic, magnetic, optical, electromagnetic, infrared, or semiconductor system, apparatus, device, or propagation medium. Examples of a computer readable medium include a semiconductor or solid state memory, magnetic tape, a removable computer diskette, a random access memory (RAM), a read-only memory (ROM), an erasable programmable read-only memory (EPROM or Flash memory, a rigid magnetic disk and an optical disk. Current examples of optical disks include compact disk-read only memory (CD-ROM), compact disk—read/write (CD-R/W) and DVD. Other computer readable medium can include a transmission media, such as those supporting the Internet, an intranet, a personal area network (PAN), or a magnetic storage device. Transmission media can include an electrical connection having one or more wires, an optical fiber, an optical storage device, and a defined segment of the electromagnet spectrum through which digitally encoded content is wirelessly conveyed using a carrier wave.

Note that the computer usable or computer readable medium can even include paper or another suitable medium upon which the program is printed, as the program can be electronically captured, for instance, via optical scanning of the paper or other medium, then compiled, interpreted, or otherwise processed in a suitable manner, if necessary, and then stored in a computer memory.

Computer program code for carrying out operations of the present invention may be written in an object oriented programming language such as Java, Smalltalk, C++ or the like. However, the computer program code for carrying out operations of the present invention may also be written in conventional procedural programming languages, such as the "C" programming language or similar programming languages. The program code may execute entirely on the user's computer, partly on the user's computer, as a stand-alone software package, partly on the user's computer and partly on a remote computer or entirely on the remote computer or server. In the latter scenario, the remote computer may be connected to the user's computer through a local area network (LAN) or a wide area network (WAN), or the connection may be made to an external computer (for example, through the Internet using an Internet Service Provider).

A data processing system suitable for storing and/or executing program code will include at least one processor coupled directly or indirectly to memory elements through a system bus. The memory elements can include local memory employed during actual execution of the program code, bulk storage, and cache memories which provide temporary storage of at least some program code in order to reduce the number of times code must be retrieved from bulk storage during execution.

Input/output or I/O devices (including but not limited to keyboards, displays, pointing devices, etc.) can be coupled to the system either directly or through intervening I/O controllers.

Network adapters may also be coupled to the system to enable the data processing system to become coupled to other data processing systems or remote printers or storage devices through intervening private or public networks. Modems, cable modem and Ethernet cards are just a few of the currently available types of network adapters.

The present invention is described below with reference to flowchart illustrations and/or block diagrams of methods, apparatus (systems) and computer program products according to embodiments of the invention. It will be understood that each block of the flowchart illustrations and/or block diagrams, and combinations of blocks in the flowchart illustrations and/or block diagrams, can be implemented by computer program instructions. These computer program instructions may be provided to a processor of a general purpose computer, special purpose computer, or other programmable data processing apparatus to produce a machine, such that the instructions, which execute via the processor of the computer or other programmable data processing apparatus, create means for implementing the functions/acts specified in the flowchart and/or block diagram block or blocks.

It will be further understood that each block of the flowchart illustrations and/or block diagrams and combinations of blocks in the flowchart illustrations and/or block diagrams can be distributed on different computer platforms.

These computer program instructions may also be stored in a computer readable memory that can direct a computer or other programmable data processing apparatus to function in a particular manner, such that the instructions stored in the computer readable memory produce an article of manufacture including instruction means which implement the function/act specified in the flowchart and/or block diagram block or blocks.

The computer program instructions may also be loaded onto a computer or other programmable data processing apparatus to cause a series of operational steps to be performed on the computer or other programmable apparatus to produce a computer implemented process such that the instructions which execute on the computer or other programmable apparatus provide steps for implementing the functions/acts specified in the flowchart and/or block diagram block or blocks.

FIG. 1 is a schematic diagram of a system 100 for containing terminal application run-time data 114 for viewing when disconnected from a host server 140 in accordance with an embodiment of the inventive arrangements disclosed herein. Terminal run-time data 114 can be captured and stored by run-time capture engine 132 based upon an interactive computing session where a terminal application 131 executes. During the session a user can interact with an interface on device 110 to exchange data 142, 144 with server 140. Format encoder 133 can format the captured data in a desired manner before storing this data 114 in data store 112. The run-time data 114 can be information that specifies typical run-time conditions, where the data 114 is able to be used to generate one or more screens. Run-time data 114 can be captured from runtime sessions or can be manually constructed at design time.

A run-time data editor 134 can permit run-time data 114 to be created and/or edited directly. A terminal playback 135 component can create terminal screens using the run-time data 114 and visual layout definition data 116. Terminal screen construction example 155 shows how layout data 160 and run-time data 170 can be combined to create output shown in terminal interface 180. Thus, terminal output screens can be viewed based upon previously logged or created run-time data 114, when a computing device 110 is disconnected from a host server 140. Appreciably, use of the layout data 160 and the run-time data is able to be performed by the terminal playback 135 component in a manner that is not dependent upon use of a device emulator for the host server and that is not dependent upon human interactive data processed by the device emulator.

The computing device 110 can include software and/or firmware 130, which specify a set of programmatic instructions that execute upon hardware 120. The hardware 120 can include one or more processors 122 connected to a volatile memory 123 and a non-volatile memory 124 via a bus 125. Hardware 120 can also include a display 126 (or display port connected to a display peripheral) for visually presenting output, such as terminal interface 180. The software or firmware 130 can include a run-time data editor 134, a terminal playback component 135, development tools or (development applications) 136, and/or other such computer program products.

The terminal application 131 can communicate over a network 150. Data exchanges involving application 131 can include a stream of characters and commands.

In one embodiment, the streams of characters (5250 data stream, 3270 data stream, IBM 3179G data stream, an HP700/92 data stream, etc.) can conform to a block-oriented terminal protocol.

A terminal interface can present screens to a user, such as screen 180. The terminal interface can be a text user interface (TUI) consisting of a rectangular array of ANSI characters. The terminal interface can also be a "modernized" graphical user interface (GUI) front-end for a terminal application 132, which exchanges data 142, 144 between device 110 and server 140 as if it were a traditional TUI front-end interface. That is, specifics of the front-end can be transparent to back-end interactions.

A visual layout for terminal application 131 can be defined within a visual layout definition 116. One foundation of the disclosure is that given one or more visual layout definitions 116, a buffer of application data (part of runtime data 114), and sufficient information about a state of the server 140 (part of runtime data 114) visual output of a terminal application 131 can be reconstructed (using data captured by engine 132) after the application 131 has run. The visual reconstructions can be utilized in a variety of contexts including, but not limited to: providing a preview of a screen when designing a screen's visual layout; providing a visual replay of interface interactions occurring during an application run; using visual flows to identity paths of an application that could be externalized in a service oriented architecture (SOA) environment, using visual application flows to assist with modernizing host user interfaces; using application flows to dynamic analysis as input to purposes such as application refactoring; and, using replay facility to aid in transforming existing TUI interface screens to alternative user interfaces (e.g., Web user interfaces), where aid in this transformation can include identifying fields and records that should be displayed different in the alternative interface, collapsing a set of sequentially displayed records into a single panel, and splitting complex screens into separate panels.

The visual layout definition 116 can specify information that an application developer specifies at design time. For example and as shown by layout data 160, the layout definition 116 can include record definitions 162, field definitions 163, field attributes 164, record attributes, 165, and the like.

The record definitions 162 can be for records, which are analogous to a record in a database. The record definition 162 is typically seen as a number of lines of characters on a display 180. Each record definition 162 can specify a set of one or more fields.

The field definitions 163 can identify which portion of the record buffer belongs to which field. The field definitions also identity the field data type describing whether those characters are numeric or alphabetic, etc. and how they are encoded.

The field and record attributes 164-165 can affect a runtime behavior or visual presentation of a field or record. Each attribute 164-165 can be enabled or disabled based upon one or more Boolean conditions. Each Boolean condition is represented by an indicator.

The visual layout definition 116 can conform to any of a number of standards including, but not limited to, Data Description Specification, Basic Mapping Support, computer program product Format services (MFS), Interactive System Productivity Facility (ISPF), JAVA server page, and the like. Development tools 136 can include text editors or visual editors, which allow an application developer to design a layout of display application screens, which results in a creation/editing on a visual layout definition 116.

In one embodiment, the development tools 136 can include components of an integrated development environment (IDE) for software development, such as one or more ECLIPSE compliant tools. Sample interfaces of FIGS. 2-5 can, for example, be interfaces of a development tool 136 having viewing and/or terminal application manipulation capabilities, as described herein.

Sample run-time data 170 shows some data able to be included within the run-time data 114 of data store 112. Data 170 can include indicator state 172 data, output device state 173 data, order of records 174 data, data in records 175, starting line 176, and the like.

Figure 3:
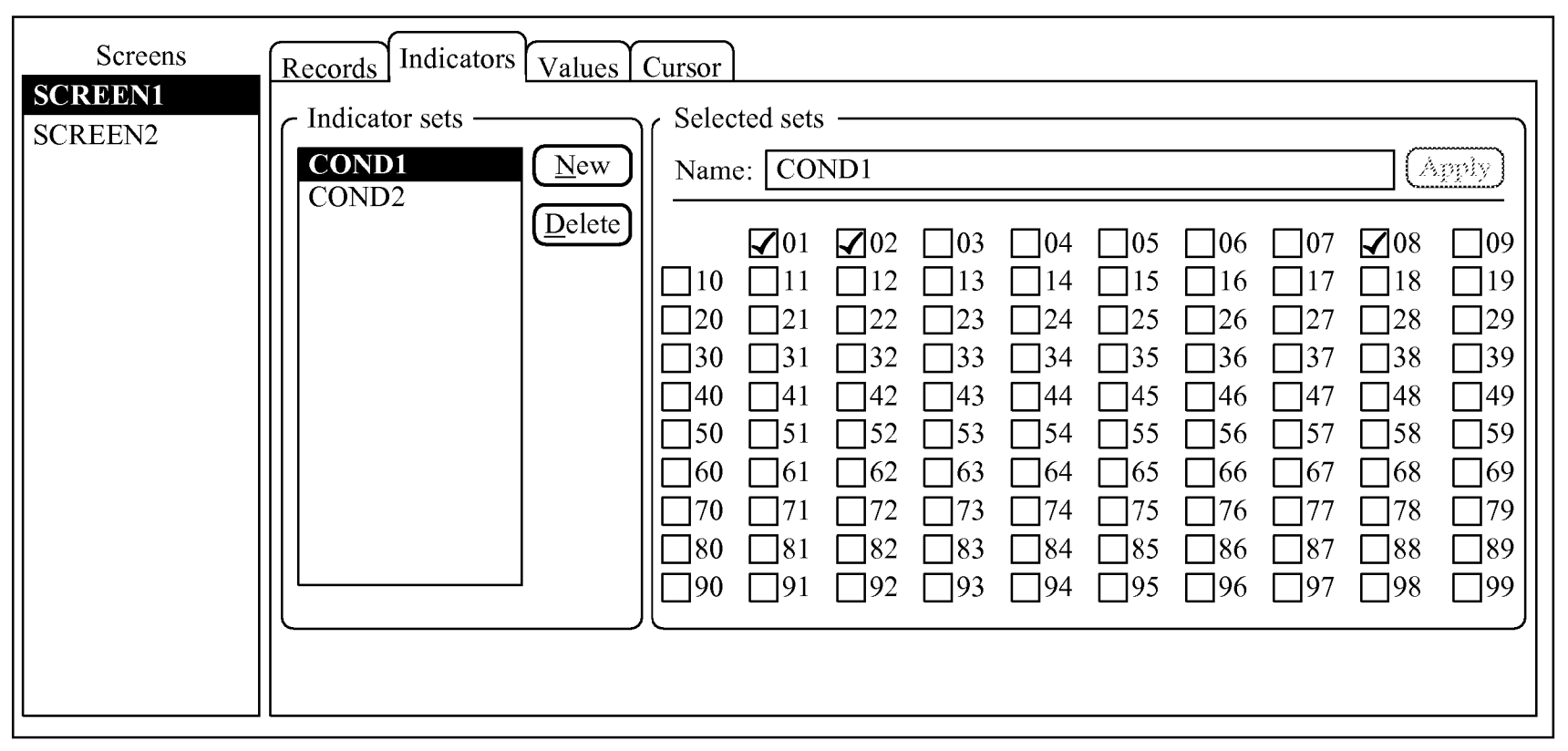

The indicator state 172 data can be a group of Boolean flags, each having a state of either on or off. Different indicator states 172 can be associated with different conditions, as shown by FIG. 3, which is an interface permitting the various indictors to be manually edited. In an embodiment where the server 140 is based upon an IBM 5250 protocol, the indicator states 172 can be numbered from one to ninety-nine.

The output device state 173 data can record data of a state of a device being written to, such as the screen size and cursor position of the device. The order of records 174 can define an order in which records are to be written to a screen. The data in records 175 can store data values for records to be written to a screen. The starting line 176 can be a programmer supplied variable that determines a starting line of certain records.

The format encoder 133 can convert captured run-time data to a persistent and standardized format. In one embodiment, the format of run-time data 115 can be written in a markup language, such as XML. Editor 134 can be tailored for the persistent standardized format in which the run-time data 114 is recorded.

FIG. 6 shows a table 600, which provides a sample XML based definition for run-time data 114. Other standards are possible and the disclosure is not to be limited to specifics of table 600, which is presented for illustrative purposes only. The child elements column of the table 600 lists possible child elements of the parent elements and the number of possible occurrences of the child element as children of the parent element. An element having a value in this column of "1" (such as field-data) indicates that only one child element may exist for a parent. An element having a value of "0 . . . 1" indicates that zero or more child elements may exist. An element having a value of "0 . . . n" indicates that zero or any number of child elements may exist. FIG. 7 shows sample XML code conforming to specifics of table 600.

FIG. 2 shows a preview of a screen 220 (which conforms to an IBM 5250 protocol standard) contained within a user interface 210. A user can make selections within the interface 210 to specify an order in which records are to be written. Selections in the interface 210 can also cause navigation to a specific interface screen or host system state.

Although screen 220 is shown as a TUI, the invention is not limited in this regard and any terminal application front-end interface, which includes a GUI based terminal window, can be shown. In one embodiment, multiple screens 220 can be concurrently displayed, where each is associated with a specific visual layout definition (116 of system 100). Use of multiple screens 220 can be helpful for designers and/or testers when modernizing a terminal application interface.

FIG. 4 shows a sample interface that allows a user to assign sample run-time properties. That is, the interface can permit a viewing and editing of run-time data 114. For example, a user can edit a records indictor set, starting line, and run-time values of included fields.

FIG. 5 shows a user interface that permits a user to specify a cursor position (e.g., output device state 173) to simulate a position of a cursor at a time records are being written.

Figure 8:
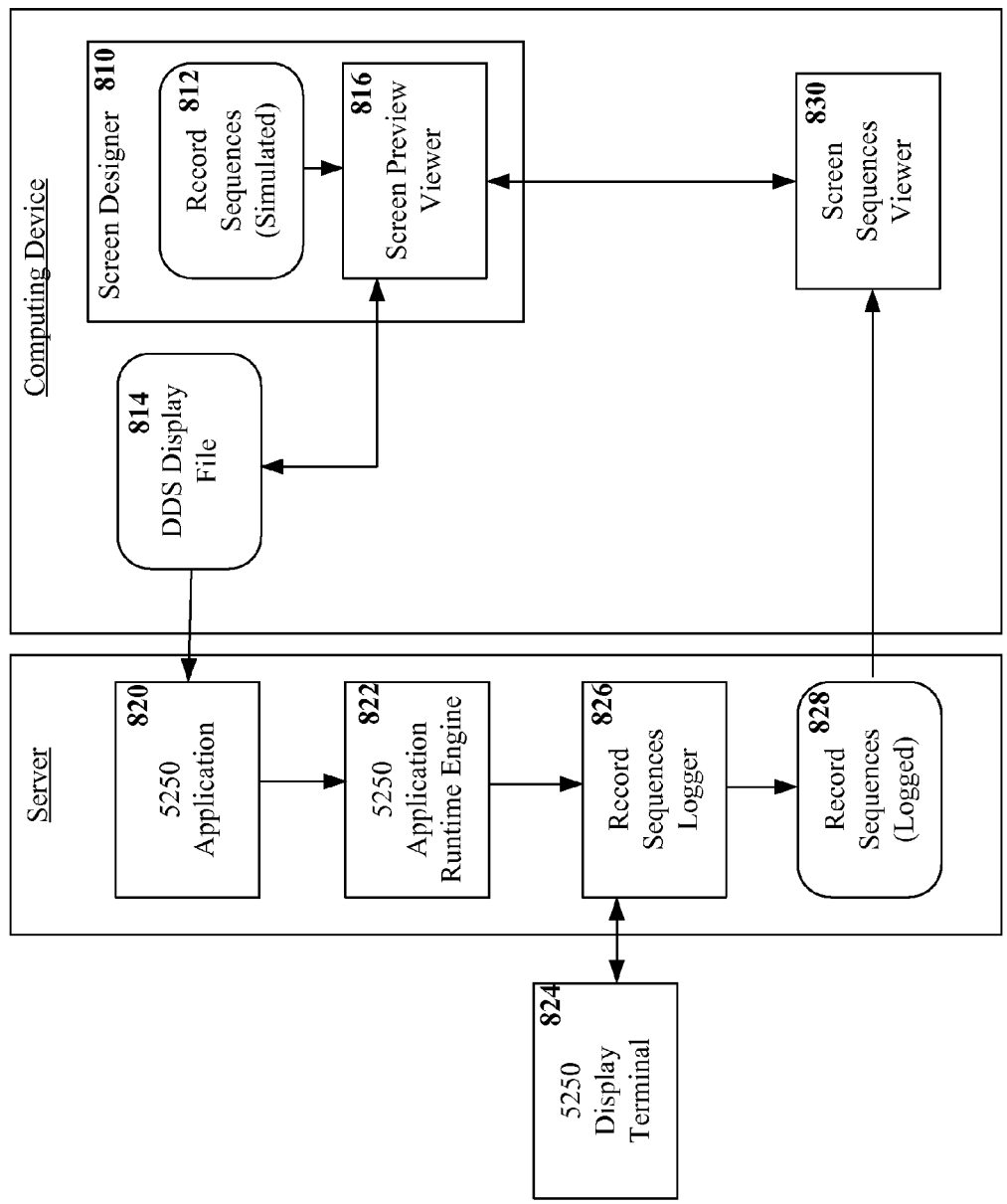
FIG. 8 is a flow diagram of a 5250 based implementation instance of the disclosure.

FIG. 8 is a flow diagram of a 5250 based implementation instance of the disclosure, which is an embodiment of system 100. This embodiment is presented for illustrative purposes and the disclosure is not to be construed as limited in this regard.

At design time, an application developer can use a screen designer software development application 810 to define records, fields, and attributes that are saved in a DDS display file 814. If the application developer wishes to simulate how one or more screens will look at run-time, the developer can specify record sequences 812 information. The developer can then use a screen preview viewer 816. Viewer 816 can be a part of a Screen Design tool, which combines the information from the DDS display file with the specified record sequences information to present a simulated preview of run-time screens.

At run-time, a 5250 application run-time engine 822 can use information from the DDS display file 814 that is a part of the 5250 application 820, to present screens to a 5250 display terminal 824. The 5250 application run-time engine 822 can log (using logger 826) the record sequences that are sent to the 5250 display terminal 824 to a file (record sequences 828). After the run-time completes, the information contained in the file 828, which contains run-time data such as record sequences, data values, etc., can be combined with the information in the DDS display file used by application 820 in order to present a visual replay of the screens that were presented during application run-time. The screen sequences viewer 830 can be used when replaying the screens. The screen sequences viewer 830 and the screen preview viewer 816 may be, but do not have to be, the same software application.

The diagrams in FIGS. 1-8 illustrate the architecture, functionality, and operation of possible implementations of systems, methods, and computer program products according to various embodiments of the present invention. In this regard, each block in the flowchart or block diagrams may represent a module, segment, or portion of code, which comprises one or more executable instructions for implementing the specified logical function(s). It should also be noted that, in some alternative implementations, the functions noted in the block may occur out of the order noted in the figures. For example, two blocks shown in succession may, in fact, be executed substantially concurrently, or the blocks may sometimes be executed in the reverse order, depending upon the functionality involved. It will also be noted that each block of the block diagrams and/or flowchart illustration, and combinations of blocks in the block diagrams and/or flowchart illustration, can be implemented by special purpose hardware-based systems that perform the specified functions or acts, or combinations of special purpose hardware and computer instructions.

The terminology used herein is for the purpose of describing particular embodiments only and is not intended to be limiting of the invention. As used herein, the singular forms "a," "an," and "the" are intended to include the plural forms as well, unless the context clearly indicates otherwise. It will be further understood that the terms "comprises" and/or "comprising," when used in this specification, specify the presence of stated features, integers, steps, operations, elements, and/or components, but do not preclude the presence or addition of one or more other features, integers, steps, operations, elements, components, and/or groups thereof.

The corresponding structures, materials, acts, and equivalents of all means or step plus function elements in the claims below are intended to include any structure, material, or act for performing the function in combination with other claimed elements as specifically claimed. The description of the present invention has been presented for purposes of illustration and description, but is not intended to be exhaustive or limited to the invention in the form disclosed. Many modifications and variations will be apparent to those of ordinary skill in the art without departing from the scope and spirit of the invention. The embodiment was chosen and described in order to best explain the principles of the invention and the practical application, and to enable others of ordinary skill in the art to understand the invention for various embodiments with various modifications as are suited to the particular use contemplated.

What is claimed is:

1. A method for viewing terminal-based content comprising:

storing run-time data and visual layout definition data in a computer useable storage medium, wherein the run-time data and the visual layout definition data are associated with a terminal application, which is configured to communicate with a host server in blocks of data in accordance with a standardized terminal protocol;

generating a visual screen for the terminal application by combining the layout data and the run-time data, wherein the generating occurs when the terminal application is disconnected from the host server and when the terminal application is disconnected from a host server emulator; and presenting the generated visual screen, the stored run-time data comprises:
state data of a plurality of Boolean indicator flags;
state data of the visual screen to which data is written;
an order in which sequential blocks of data are to be written to the visual screen; and
data values of fields of records to be written to the visual screen, the visual layout definition data comprises:
record definitions for the blocks of data, where each record defined by the record definitions comprises at least one field;
field definitions each of which represents a data value or string constant within a record; and
field attributes and record attributes, each of which affects at least one of a run-time behavior or visual presentation of a field or record, wherein each of the field attributes and record attributes is enabled or disabled based upon a Boolean condition.

2. The method of claim 1, wherein the generating of the visual screen and the presenting of the generated visual screen is performed by a terminal playback software component, which is not dependent upon use of a device emulator for the host server and is not dependent upon human interactive data processed by the device emulator.

3. The method of claim 1, wherein the run-time data and the visual layout data in combination permit the generated visual screen to represent a previously recorded visual representation of a terminal screen of a session involving the terminal application and the host server, where the run-time data is previously captured data from the session.

4. A computer program product for viewing terminal-based content comprising a computer usable storage medium having computer usable program code embodied therewith, the computer usable program code comprising:

computer usable program code configured to store run-time data and visual layout definition data in a storage medium, wherein the run-time data and the visual layout definition data are associated with a terminal application, which is configured to communicate with a host server in blocks of data in accordance with a standardized terminal protocol;

computer usable program code configured to generate a visual screen for the terminal application by combining the layout data and the run-time data, wherein the generating occurs when the terminal application is disconnected from the host server and when the terminal application is disconnected from a host server emulator; and computer usable program code configured to present the generated visual screen, the stored run-time data comprises:
state data of a plurality of Boolean indicator flags;
state data of the visual screen to which data is written;
an order in which sequential blocks of data are to be written to the visual screen; and
data values of fields of records to be written to the visual screen, the visual layout definition data comprises:
record definitions for the blocks of data, where each record defined by the record definitions comprises at least one field;
field definitions each of which represents a data value or string constant within a record; and
field attributes and record attributes, each of which affects at least one of a run-time behavior or visual presentation of a field or record, wherein each of the field attributes and record attributes is enabled or disabled based upon a Boolean condition.

5. The computer program product of claim 4, wherein the computer usable program code that generates of the visual screen and presents the generated visual screen is performed by a terminal playback software component, which is not dependent upon use of a device emulator for the host server and is not dependent upon human interactive data processed by the device emulator.

6. The computer program product of claim 4, wherein the run-time data and the visual layout data in combination permit the generated visual screen to represent a previously recorded visual representation of a terminal screen of a session involving the terminal application and the host server, where the run-time data is previously captured data from the session.

7. A system for viewing terminal-based content comprising:
a processor;
a non-volatile memory;
a volatile memory; and
a bus connecting said processor, said non-volatile memory, and said volatile memory, wherein a set of computer readable instructions are stored in the non-volatile memory, which are executable by the processor, wherein said system is configured to:
store run-time data and visual layout definition data in a storage medium, wherein the run-time data and the visual layout definition data are associated with a terminal application, which is configured to communicate with a host server in blocks of data in accordance with a standardized terminal protocol;
generate a visual screen for the terminal application by combining the layout data and the run-time data, wherein the generating occurs when the terminal application is disconnected from the host server and when the terminal application is disconnected from a host server emulator; and
present the generated visual screen,
the stored run-time data comprises:
state data of a plurality of Boolean indicator flags;
state data of the visual screen to which data is written;
an order in which sequential blocks of data are to be written to the visual screen; and
data values of fields of records to be written to the visual screen,
the visual layout definition data comprises:
record definitions for the blocks of data, where each record defined by the record definitions comprises at least one field;
field definitions each of which represents a data value or string constant within a record; and
field attributes and record attributes, each of which affects at least one of a run-time behavior or visual presentation of a field or record, wherein each of the field attributes and record attributes is enabled or disabled based upon a Boolean condition.

8. The system of claim 7, wherein generating of the visual screen and presenting of the generated visual screen is performed by a terminal playback software component, which is not dependent upon use of a device emulator for the host server and is not dependent upon human interactive data processed by the device emulator.

9. The system of claim 7, wherein the run-time data and the visual layout data in combination permit the generated visual screen to represent a previously recorded visual representation of a terminal screen of a session involving the terminal application and the host server, where the run-time data is previously captured data from the session.

\* \* \* \* \*